L. BLASS.
DOUGH MIXER.
APPLICATION FILED MAR. 9, 1911.

1,003,422.  Patented Sept. 19, 1911.

Witnesses
Anna C. Raviler
Lewis E. Flandert

Inventor
Lambert Blass
By
Attorneys

UNITED STATES PATENT OFFICE.

LAMBERT BLASS, OF DETROIT, MICHIGAN.

DOUGH-MIXER.

1,003,422.

Specification of Letters Patent.   Patented Sept. 19, 1911.

Application filed March 9, 1911.   Serial No. 613,415.

*To all whom it may concern:*

Be it known that I, LAMBERT BLASS, a subject of the Emperor of Austria-Hungary, residing at Detroit, in the county of Wayne and State of Michigan, have invented certain new and useful Improvements in Dough-Mixers, of which the following is a specification, reference being had therein to the accompanying drawings.

This invention relates to improvements in dough mixing machines and its object is to provide means for driving the mixing blades and separate means for tilting the mixing trough which tilting means is arranged to lock the trough in the position to which it is turned and to automatically stop the turning movement.

A further object of the invention is to provide certain other new and useful features in the construction and arrangement of parts all as hereinafter more fully described and particularly pointed out in the claims reference being had to the accompanying drawing in which—

Figure 1:
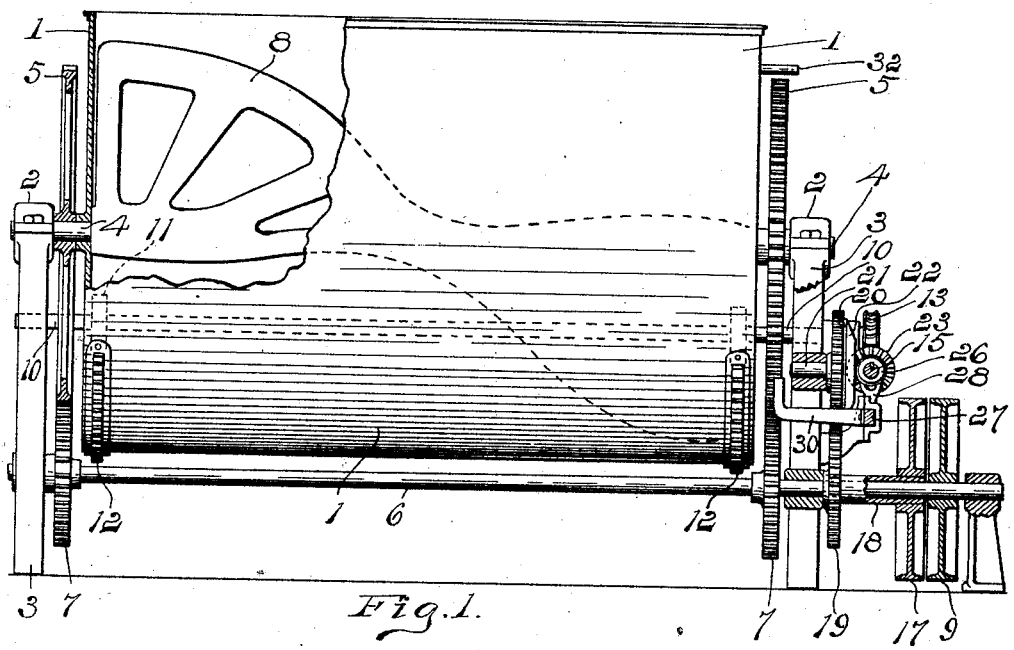
Figure 2:
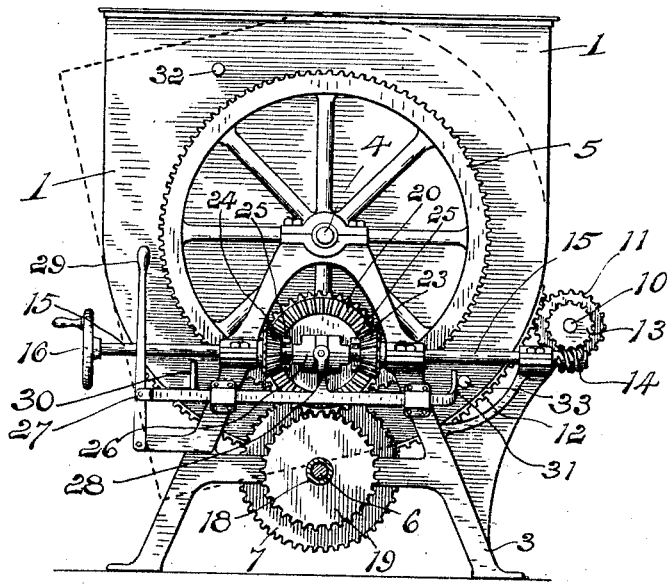

Figure 1 is a side elevation of a machine embodying the invention, with parts in section to show the construction; and Fig. 2 is an end elevation.

As shown in the drawing, an open mixing trough 1 having a semi-circular bottom, is supported at its ends to turn within suitable bearings 2 upon end frames 3. Upon the shaft 4 which carries a mixing blade 8 within the trough, are secured two large gears 5, one at each end of the trough, and a driving shaft 6 extends longitudinally beneath the trough and is supported in bearings on the frames 3. Gears 7 on the shaft 6 engage the gears 5 to drive the shaft 4 and turn the mixing blade. A pulley 9 is secured to the outer end of the shaft 6 to turn the same.

Mounted in suitable bearings upon the end frames 3 and extending longitudinally of the trough at the rear side thereof, is a shaft 10 provided with a pair of small gears 11 engaging gear segments 12 secured upon the semi-circular bottom of the trough near each end. On one end of the shaft 10 is secured a worm gear 13 to engage a worm 14 on the end of a transverse shaft 15 mounted in bearings on one of the end frames and extending across the right hand end of the machine to its forward side where it is provided with a hand wheel 16 by means of which the shaft may be turned to actuate the shaft 10 and through the medium of the gears 11 tilt the trough.

Power may be applied to turn the shaft 15 by means of a pulley 17 secured upon a sleeve 18 on the driving shaft 6 and arranged adjacent to the driving pulley 9 so that the driving belt may be shifted from the pulley 9 to the pulley 17. Secured upon the inner end of the sleeve 18 is a gear 19 in engagement with the gear 20 mounted upon a stud shaft 21 on the end frame. Secured to the outer side of the gear 20 is a bevel gear 22 and mounted upon the shaft 15 which extends across adjacent to the outer side of the beveled gear 22 are two beveled pinions 23 and 24 loosely mounted upon the shaft and each provided with clutch members 25 at their inner ends to engage a mating clutch member 26 splined upon the shaft to turn therewith and free to shift longitudinally thereon into engagement with either of the gear members. Mounted in bearings preferably below the shaft 15 and extending parallel therewith, is a shifting bar 27 having an upwardly extending yoke arm 28 pivotally connected with the clutch member 26 so that when the bar is shifted longitudinally the clutch member will be moved. A hand lever 29 is provided to shift the bar 27 and extending laterally from the bar near the ends thereof toward the end of the trough, are arms 30 and 31 adapted to be engaged by pins 32 and 33 respectively, projecting outward from the end of the trough.

When it is desired to tilt the trough and remove the dough therefrom, the operator may do so by turning the hand wheel 16 and the trough will be held in any position to which it is turned by the worm 14. If he desires to use power for tilting the trough, he may shift the driving belt from the pulley 9 to the pulley 17, when motion will be transmitted from said pulley 17 through the sleeve 18 and gears 19, 20 and 22 to the loose pinions 23 and 24 on the shaft 15. Then by means of the lever 29 he may shift the clutch 26 into engagement with the corresponding clutch member on the pinion 24 when motion will be transmitted from said pinion to the shaft 15 and worm 14 to tilt the trough. The tilting is automatically stopped when the trough has reached the position shown in dotted lines in Fig. 2, by the pin 32 on the end of the trough coming into engagement with the arm 30 and shifting the bar 27 longitudinally, thus moving the clutch member 26 to mid position out of engagement with the corresponding clutch member on the pinion 24. The transmission of motion to the shaft 15 is thus automatically stopped and the worm 14 holds the trough in the position to which it has been tilted. When the operator desires to again turn the trough into upright position he may do so by shifting the clutch member 26 into engagement with the corresponding member on the pinions 23 when motion will be transmitted from said pinion to the shaft 15 in a reverse direction and the worm 14 and gears 11 will be actuated in a direction to turn the trough into vertical position as shown in full lines in Fig. 2. This upward turning movement is automatically stopped by the pin 33 on the end of the trough coming into engagement with the arm 31 on the bar 27 and shifting said bar to move the clutch member 26 out of engagement with the member on the pinion 23.

Having thus fully described my invention what I claim is:—

1. In a dough mixing machine, the combination of a tiltable trough, a blade shaft within the axis of the trough, a mixing blade upon said shaft within the trough, gears on the blade shaft at the ends of the trough, a driving shaft extending beneath the trough, gears on the driving shaft engaging the gears on the blade shaft, a pulley secured to the driving shaft, a sleeve on the driving shaft, a second pulley secured to the sleeve adjacent to the pulley on the driving shaft and adapted to receive a shiftable driving belt, a worm and worm gear arranged to tilt the trough, and means for transmitting motion from the sleeve on the driving shaft to the worm to turn the same in either direction.

2. In a dough mixing machine, the combination of supporting end frames, a tiltable trough mounted in bearings in said end frames, a blade shaft extending through the trough at the axis thereof, a mixing blade within the trough upon the blade shaft, gears on the blade shaft at each end of the trough, a driving shaft extending longitudinally of the trough beneath the same, gears on the driving shaft engaging the gears on the blade shaft, a gear segment secured to the trough, a longitudinal shaft mounted in bearings on the end frames at one side of the trough, a gear on the longitudinal shaft engaging the gear segment, a transverse shaft mounted in bearings on one of the end frames, a worm on the transverse shaft engaging the worm gear on the longitudinal shaft, a hand wheel on the transverse shaft for turning the same, a pair of pinions loosely mounted on the transverse shaft, a clutch on the transverse shaft between the pinions for connecting either pinion to the shaft, a stub shaft on the end frame, a beveled gear on the stub-shaft engaging the pinions to drive the same, a sleeve on the driving shaft, means for transmitting motion from the sleeve to the bevel gear, and pulleys on the drive shaft and sleeve arranged adjacent to each other.

In testimony whereof I affix my signature in presence of two witnesses.

LAMBERT BLASS.

Witnesses:
LEWIS E. FLANDERS,
ANNA C. RAVILER.